United States Patent
Dumais et al.

(10) Patent No.: US 9,288,666 B2
(45) Date of Patent: Mar. 15, 2016

(54) STORAGE OF APPLICATIONS AND ASSOCIATED DIGITAL GOODS FOR USE IN WIRELESS COMMUNICATION DEVICES AND SYSTEMS

(75) Inventors: Paul Mark Joseph Dumais, Ottawa (CA); Kimberly Chaila Horne, Ottawa (CA); Raymond Lee Canton, Ottawa (CA); Stephen Reeves, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 306 days.

(21) Appl. No.: 13/823,189

(22) PCT Filed: Sep. 16, 2011

(86) PCT No.: PCT/CA2011/050568
§ 371 (c)(1),
(2), (4) Date: Mar. 14, 2013

(87) PCT Pub. No.: WO2012/037675
PCT Pub. Date: Mar. 29, 2012

(65) Prior Publication Data
US 2013/0171978 A1    Jul. 4, 2013

Related U.S. Application Data

(60) Provisional application No. 61/386,174, filed on Sep. 24, 2010.

(51) Int. Cl.
*H04W 8/24* (2009.01)
*G06F 9/445* (2006.01)
(Continued)

(52) U.S. Cl.
CPC .............. *H04W 8/245* (2013.01); *G06F 8/60* (2013.01); *G06Q 30/0601* (2013.01); *H04L 67/34* (2013.01); *H04W 4/001* (2013.01); *H04W 8/20* (2013.01)

(58) Field of Classification Search
CPC ....... H04W 8/245; H04W 4/001; H04W 8/20; H04L 67/34; G06Q 30/0601; G06F 8/60
USPC .............................. 455/412.1–420, 3.01–3.06
See application file for complete search history.

(56) References Cited

U.S. PATENT DOCUMENTS 6,606,744 B1 *  8/2003  Mikurak ................. H04L 29/06
                                                            717/174
7,454,199 B2 * 11/2008  Minear ..................... G06F 8/62
                                                            455/414.1
(Continued)

FOREIGN PATENT DOCUMENTS

WO        2006091654        8/2006

OTHER PUBLICATIONS

PCT International Search Report relating to application No. PCT/CA2011/050568 dated Mar. 16, 2012.
(Continued)

*Primary Examiner* — Sharad Rampuria
(74) *Attorney, Agent, or Firm* — Rowand LLP (57) ABSTRACT

Methods and devices for restoring digital goods previously acquired and associated with an application are described. In one aspect, the method includes: receiving, at an application delivery server, a request for the application to be delivered to a communication device; and in response to receiving the request: retrieving the application associated with the request; sending the application associated with the request to the communication device; and restoring the digital goods previously acquired and associated with the application to the communication device.

19 Claims, 4 Drawing Sheets

(51) Int. Cl.
*H04W 4/00* (2009.01)
*G06Q 30/06* (2012.01)
*H04L 29/08* (2006.01)
*H04W 8/20* (2009.01)

(56) References Cited

U.S. PATENT DOCUMENTS

| | | | | |
|---|---|---|---|---|
| 8,351,911 B1* | 1/2013 | Martin | ............... | H04M 1/72525 455/414.2 |
| 2005/0191998 A1* | 9/2005 | Onyon | ................ | G06F 11/1446 455/419 |
| 2005/0288006 A1* | 12/2005 | Apfel | .............. | H04M 1/2745 16 455/418 |
| 2007/0197202 A1* | 8/2007 | Sprigg | ...................... | G06F 8/60 455/418 |
| 2008/0034314 A1* | 2/2008 | Louch | ....................... | G06F 8/60 715/778 |
| 2008/0147530 A1 | 6/2008 | Kwan et al. | | |
| 2008/0276321 A1 | 11/2008 | Svancarek et al. | | |
| 2009/0106110 A1* | 4/2009 | Stannard | ................. | G06F 17/30 705/14.1 |
| 2009/0259496 A1 | 10/2009 | Olson et al. | | |
| 2010/0179942 A1 | 7/2010 | Wallis et al. | | |
| 2010/0197219 A1* | 8/2010 | Issa | ........................ | H04H 20/57 455/3.06 |
| 2012/0142327 A1* | 6/2012 | Urbanek | ............... | H04W 4/001 455/418 |
| 2013/0029652 A1* | 1/2013 | Nakrani | .............. | H04L 67/1097 455/418 |
| 2014/0179272 A1* | 6/2014 | Zhang | ................... | H04W 4/001 455/411 |

OTHER PUBLICATIONS

Valve Corporation, "Steam Support—Using the Steam Backup Feature", http://web.archive.org/web/20091227225441/https://support.steampowered.com/kb_article.php?ref=8794-YPHV-2033, Mar. 6, 2008.

Valve Corporation, "Steam Support—Uninstalling Steam", http://web.archive.org/web/20091227223619/https://support.steampowered.com/kb_article.php?ref=9609-OBMP-2526, Feb. 9, 2008.

vBulletin Solutions, Inc., "Steam Users' Forum—Steam Backup Feature", http://forums.steampowered.com/forums/archive/index.php/t-1768286.html, Feb. 22, 2011.

Valve Corporation, "Steam Support—Moving a Steam Installation and Games", http://web.archive.org/web/20091227223354/https://support.steampowered.com/kb_article.php?ref=7418-YUBN-8129, Mar. 4, 2008.

Valve Corporation, "Steam Support—Information for New Users", http://web.archive.org/web/20091227223714/https://support.steampowered.com/kb_article.php?ref=7141-OPGX-5121, Feb. 8, 2008.

CIPO, CA Office Action relating to U.S. Pat. No. 2,811,332, dated Nov. 23, 2015.

* cited by examiner

STORAGE OF APPLICATIONS AND ASSOCIATED DIGITAL GOODS FOR USE IN WIRELESS COMMUNICATION DEVICES AND SYSTEMS

This application claims the benefit of and priority to U.S. Provisional Patent Application No. 61/386,174 filed Sep. 24, 2010 under the title STORAGE OF APPLICATIONS AND ASSOCIATED DIGITAL GOODS FOR USE IN WIRELESS COMMUNICATION DEVICES AND SYSTEMS. The content of the above patent application is hereby expressly incorporated by reference into the detailed description hereof.

TECHNICAL FIELD

This application relates to the field of wireless communications, and more particularly, to wireless communications devices and related methods.

BACKGROUND

Mobile wireless communications systems continue to grow in popularity and have become an integral part of both personal and business communications. By way of example, cellular telephones allow users to place and receive voice calls most anywhere they travel. Moreover, as cellular telephone technology has increased, so too has the functionality of cellular devices and the different types of devices available to users. For example, many cellular or wi-fi devices now incorporate personal digital assistant (PDA) features such as calendars, address books, task lists, etc. Moreover, such multi-function or "smart" devices may also allow users to wirelessly send and receive electronic mail (email) messages and access the Internet via a cellular network and/or a wireless local area network (WLAN), for example.

Mobile devices such as smart phones are also capable of running relatively sophisticated applications, such as games, document processing applications, chat or instant messaging applications, etc. As a result, it may be desirable to provide enhanced approaches for accessing and managing applications for mobile devices, especially as new applications continue to be developed and become available.

BRIEF DESCRIPTION OF THE DRAWINGS

Like reference numerals are used in the drawings to denote like elements and features.

DETAILED DESCRIPTION OF THE EXAMPLE EMBODIMENTS

In one aspect, the present disclosure describes a method of restoring digital goods previously acquired and associated with an application. The method includes: receiving, at an application delivery server, a request for the application to be delivered to a communication device; and in response to receiving the request: i) retrieving the application associated with the request; ii) sending the application associated with the request to the communication device; and iii) automatically restoring the digital goods previously acquired and associated with the application to the communication device.

In another aspect, the present disclosure describes an application delivery system. The application delivery system includes: an application delivery server including a communication subsystem to communicate over a wireless communications network, the application delivery server including a controller configured to: receive, at an application delivery server, a request for the application to be delivered to a communication device; and in response to receiving the request: i) retrieve the application associated with the request; ii) send the application associated with the request to the communication device; and iii) automatically restore the digital goods previously acquired and associated with the application to the communication device.

In another aspect, the present disclosure describes a non-transitory computer readable storage medium including computer readable instructions which, when executed, configure a processor to: receive, at an application delivery server, a request for the application to be delivered to a communication device; and in response to receiving the request: i) retrieve the application associated with the request; ii) send the application associated with the request to the communication device; and iii) automatically restore the digital goods previously acquired and associated with the application to the communication device.

In yet another aspect, the present disclosure describes a method of managing the use of applications from an application delivery server to a user of a wireless communications network. The method includes: storing, in a memory, application data for applications authorized for delivery to a first wireless communication device of the user, the application data including information regarding digital goods acquired by the user from within authorized applications; receiving, at the application delivery server, a request for an authorized application to be delivered to a second wireless communication device of the user; in response to receiving the request, retrieving the authorized application associated with the request, retrieving application data associated with the authorized application, delivering the authorized application and the application data to the second wireless communications device; and restoring digital goods within the authorized application delivered to the second wireless communications device based upon the application data including the information regarding digital goods.

In yet another aspect, the present disclosure describes a method of backing up application data associated with an application. The method includes: detecting a trigger event at the mobile device; and in response, sending the application data to a server.

The present description is made with reference to the accompanying drawings, in which example embodiments are shown. However, many different example embodiments may be used, and thus the description should not be construed as limited to the example embodiments set forth herein. Rather, these example embodiments are provided so that this disclosure will be thorough and complete.

Example Communication System

Figure 1:
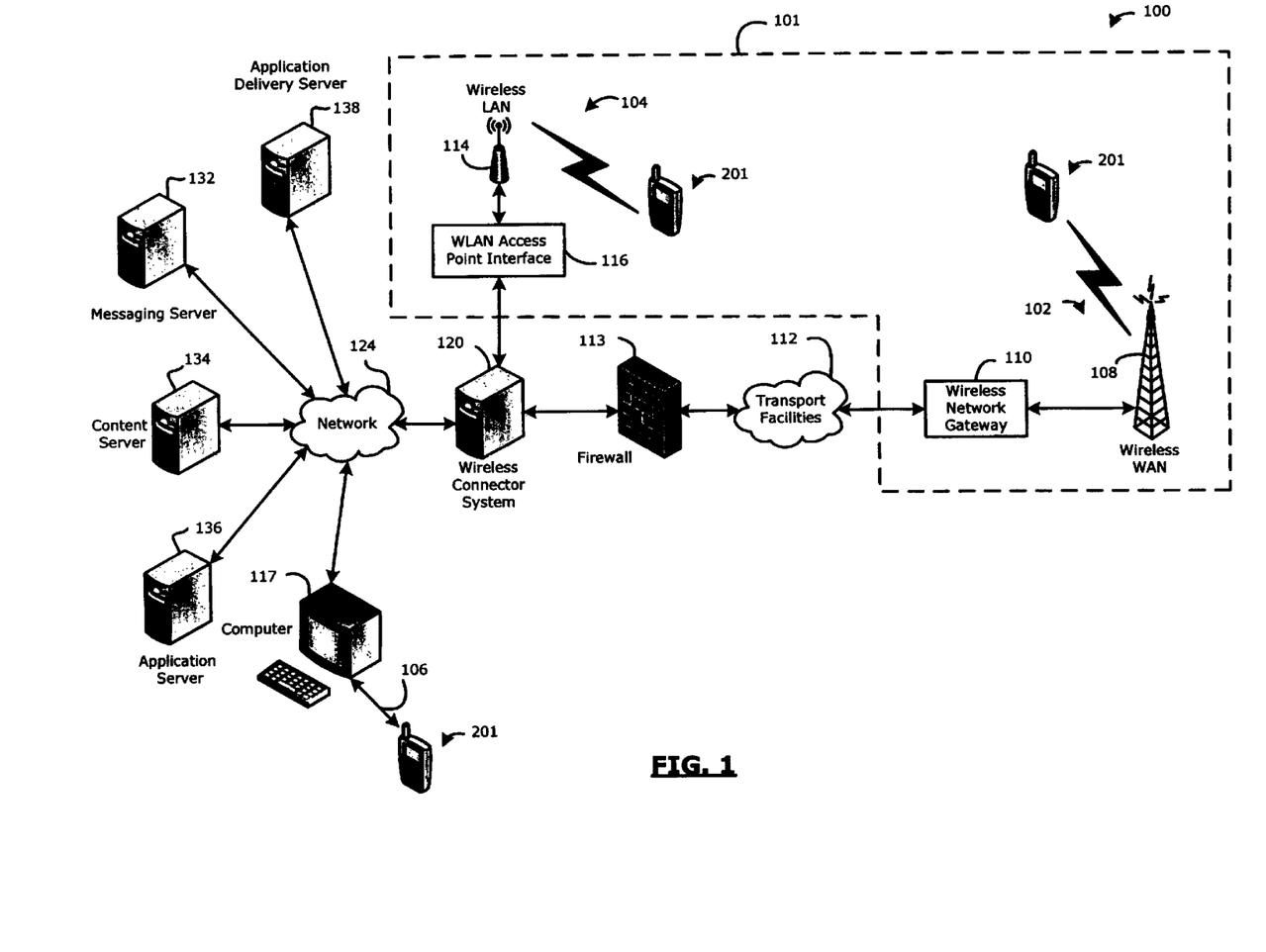
FIG. 1 is a schematic block diagram illustrating a communication system including a mobile communication device and an application delivery server to which example embodiments of the present disclosure can be applied.

For an understanding of one possible environment in which example embodiments described herein can operate, reference is first made to FIG. 1 which shows in block diagram form a communication system 100 in which example embodiments of the present disclosure can be applied. The communication system 100 includes a number of mobile communication devices 201 (also referred to herein as mobile devices) which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 also allows the mobile communication devices 201 to access an application delivery server 138. The application delivery server 138 is configured to deliver applications to the mobile devices 201 upon request by the mobile device 201. Applications are programs that include instructions for the mobile device 201 which provide a user of the mobile device 201 with tools to accomplish a task. By way of non-limiting example, the applications may include word processions applications, media player applications, database applications, games, etc. The application delivery server 138 may be configured to act as a remote storage facility for the mobile device 201 to permit users of the mobile communication devices 201 to re-download (i.e.

re-transmit) applications that were previously downloaded (i.e. transmitted), purchased and/or otherwise acquired.

In at least some example embodiments, the application delivery server 138 acts as, or interfaces with an application data backup server and is configured to store application data. Application data is data which is used by an application and which is, in some example embodiments, user or device specific data. The application data may, in various example embodiments, include user settings or preferences associated with an application, user achievements (i.e. high scores associated with a game), etc. The application data is, in at least some example embodiments, configured or created by a user of the mobile device 201.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, application delivery server 138 or application servers 136. Conversely, the wireless connector system 120 sends data packets received, for example, from the messaging server 132, content server 134, application delivery server 138 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, application delivery server 138 and application server 136.

The network 124 may include a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may include one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system includes one possible communication network configuration of a multitude of possible configurations for use with the mobile communication devices 201. The teachings of the present disclosure may be used in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Figure 2:
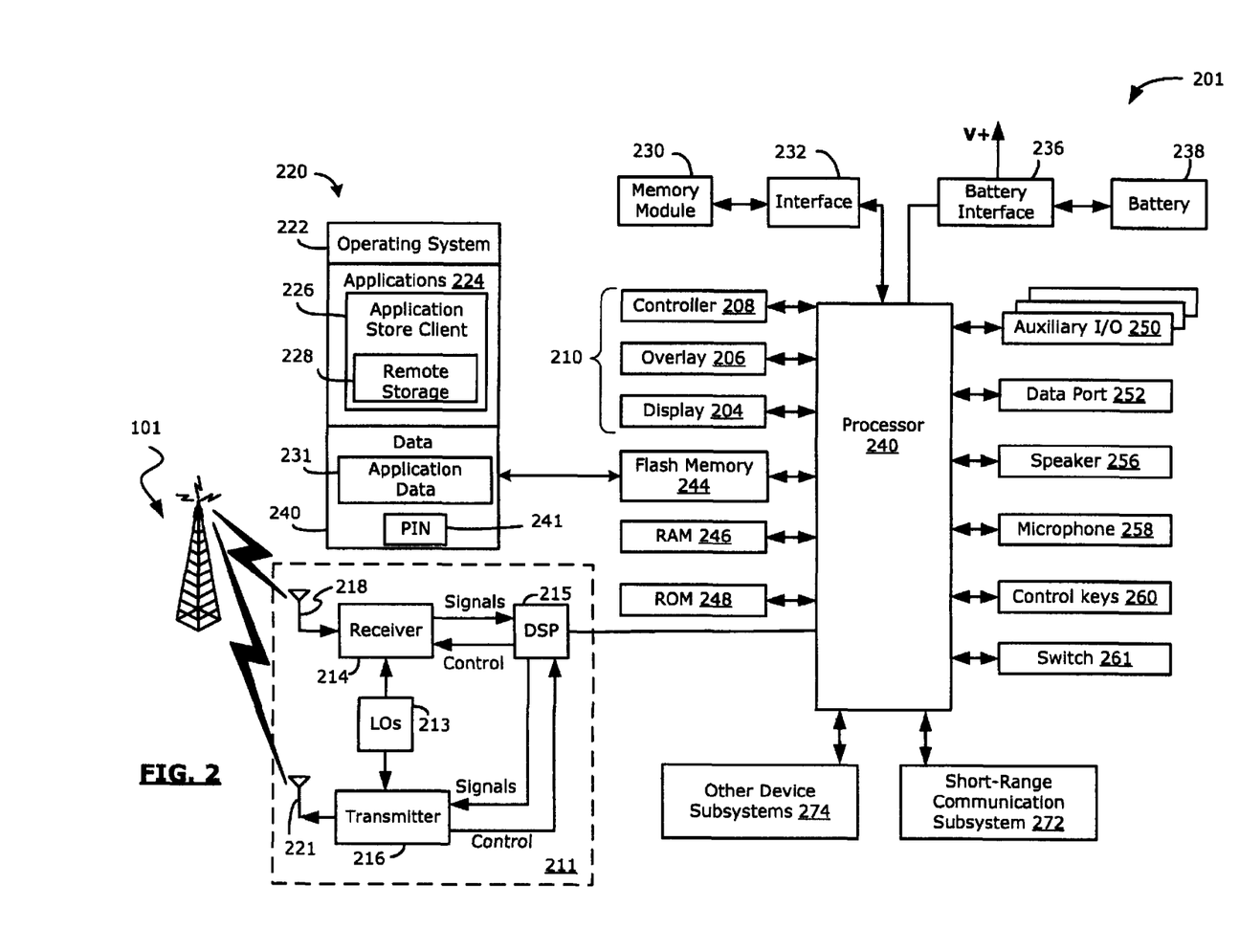
FIG. 2 is a schematic block diagram illustrating the mobile communication device of FIG. 1 in accordance with one example embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various example embodiments the mobile device 201 may be a data communication device, a multiple-mode communication device configured for both data and voice communication, a smartphone, a tablet computer, a mobile telephone or a PDA (personal digital assistant) enabled for wireless communication, or a computer system with a wireless modem.

The mobile communication device 201 includes a controller including at least one processor 240 such as a microprocessor which controls the overall operation of the mobile communication device 201, and a wireless communication subsystem 211 (also referred to as wireless communication circuitry) for exchanging radio frequency signals with the wireless network 101. The processor 240 interacts with the communication subsystem 211 which performs communication functions. The processor 240 interacts with additional device subsystems. In some example embodiments, the mobile device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism to provide a touch-sensitive input device. The processor 240 also interacts with the touch-sensitive overlay 206 via the electronic controller 208. In other example embodiments, the display 204 may not be a touch-screen display. Instead, the mobile device 201 may simply include a non-touch display and one or more input mechanisms, such as, for example, a depressible scroll wheel.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

The processor 240 operates under stored program control and executes software modules 220 stored in memory such as persistent memory; for example, in the flash memory 244. As illustrated in FIG. 2, the software modules 220 include operating system software 222 and software applications 224. The software applications 224 include an application store client 226 for requesting and receiving software applications from the application delivery server 138 (FIG. 1) and interacting with the application delivery server 138 to provide remote application storage capabilities to the mobile device 201. The application store client 226 permits users of the mobile communication device 201 to connect to the application delivery server 138 and to browse or search for applications available for download (i.e. transmission) to their mobile communication device 201. The application store client 226 permits users to purchase applications for use on their mobile device 201.

A user of the mobile communication device 201 may request an application from the application delivery server 138 by interacting with the application store client 226 on the mobile device; for example, by using the touchscreen display 210, control keys 260 or other input mechanism. In response to receiving a request to download an application from the user, the application store client 226 of the mobile communication device 201 may transmit a download request to the application delivery server 138 and wait for the application delivery server 138 to transmit the specified application to the mobile device 201. The mobile device 201 receives the application from the application delivery server 138. In some example embodiments, the application may require installation onto the mobile device 201 before it may be used. In such cases the application may be installed to the mobile device 201. Later, the application may be removed from the mobile device 201. For example, at the request of the user the application may be uninstalled. After such deletion, the application can subsequently be retrieved and installed using a remote storage module 228 of the mobile device 201.

Some applications include the option of acquiring (e.g. purchasing) digital goods associated with the application. Digital goods are goods that are stored, delivered and used in an electronic format such as, for example, e-books, music files, digital images, etc. For example, from within the application, a developer of a news media application may offer upgraded feeds or subscriptions, or a game application may include the ability to purchase additional levels. Such "in-application" purchases of digital goods may also include links to content stored elsewhere.

Figure 3:
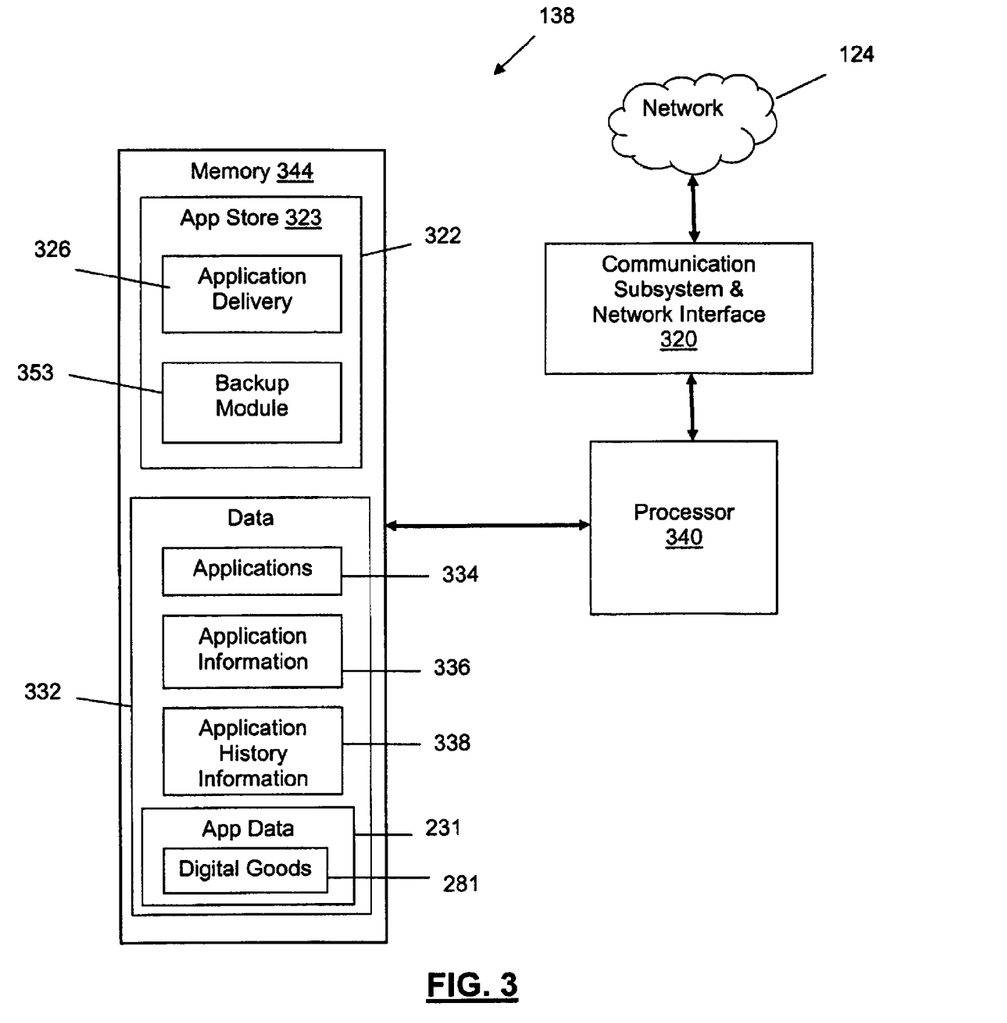
FIG. 3 is a schematic block diagram illustrating the application delivery server of FIG. 1 in accordance with one example embodiment of the present disclosure.

In at least some example embodiments, when the application is removed from the mobile device 201 (for example, when it is deleted by the user), application data 231 associated with that application may be transmitted to a remote server, such as the application delivery server 138. The application delivery server 138 may store the application data 231 in a memory 344 (FIG. 3). In some example embodiments, the application data 231 may be retrieved from the server and restored on the mobile device 201 if and when the application is retrieved. In at least some example embodiments, such retrieval may occur automatically. For example, when an application is restored, the application data 231 may be automatically restored, without direct input to do so from a user.

The application data 231 may include email messages, address book and contact information, calendar and schedule information, notepad documents, image files, and other commonly stored user information stored on the mobile communication device 201 by its user, and other data. Also, the application data 231 may include application data 231 which is associated with a specific application. For example, an application which is a game may have associated application data 231 specifying high scores, etc. The application data 231 may also include the digital goods purchased from within the application, such as additional levels for the game application.

The remote storage module 228 is configured to interact with the application delivery server 138 to provide remote storage capabilities for the mobile device. To provide such capabilities, the remote storage module 228 may be configured to transmit identification information to the application delivery server 138. The remote storage capabilities may be related to either a user, account, or, in some example embodiments, a specific device. The identification information may, in some example embodiments, identify the mobile device 201. For example, the identification information may be a Personal Identification Number ("PIN") 241 associated with the mobile device 201. In other example embodiments, the identification information may identify a user or account associated with the mobile device 201. For example, the identification information may include one or more of a username and/or password, log-in information associated with the user or account, a unique identification number associated with the user or account, or an email address associated with the user or account.

The application delivery server 138 may determine, from the identification data, any applications that are available for re-download (i.e. re-transmission) and may transmit data identifying these applications to the mobile device 201.

The applications which are said to be available for re-download may, in some example embodiments, be applications which were previously downloaded by (i.e. transmitted to) either the mobile device 201 or by another mobile device associated with the same user. In some example embodiments, the applications which are said to be available for re-download are applications which the user of the mobile device 201 has previously purchased.

In at least one mode, the remote storage module 228 of the mobile device 201 is configured to display, on the display screen 204, data received from the application delivery server 138 which identifies at least one application available for re-download. For example, it may display data identifying one or more previously downloaded applications which are available for re-download to the mobile device. The displayed data may be presented in a list format in some example embodiments. The list may include two or more applications which are available for re-download to the mobile device 201.

In some example embodiments, a user may request that an application be re-downloaded to the mobile device 201 using an input mechanism associated with the mobile device; for example, the touchscreen display 210 or the control keys 260. The user may navigate, through a display screen containing a plurality of applications available for re-download, to a desired application available for re-downloading and select a "download" or other option to initiate the re-downloading of the application.

Upon receiving a user input to re-download an application, the remote storage module 228 of the application store client 226 transmits a request to the application delivery server 138 to request the delivery of the application. The request includes an identifier, such as a product number, associated with the application which permits the application delivery server 138 to determine the application that the request relates to. The application delivery server 138 may then cause the application to be transmitted and the application is received at the mobile communication device. In some example embodiments, the application may be automatically installed following its receipt.

The remote storage module 228 may, in some example embodiments, be launched from within the application store client 226. That is, the user may load the application store client 226 and may select an option to load the remote storage module 228 portion of the application store client 226. For example, the user may select an option entitled "Digital Storage Locker", "Remote Applications", "Previously Downloaded Applications" or "My World™" or an option with another similar descriptor. In other example embodiments, the remote storage module 228 may be a stand-alone component that is operationally separate from the application store client 226 and that is loadable by selecting an appropriate icon in an icon grid on a home page associated with the mobile device 201.

The application store client 226 and the remote storage module 228 may, among other things, be implemented through stand-alone software applications, or combined together in one or more of the operating system 222 and applications 224. In some example embodiments, the functions performed by the above identified applications 224 may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, an address book application, a messaging application, a calendar application, and/or a notepad application. In some example embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application. As discussed above, any of such applications may offer the ability for the user to acquire digital goods from within the application.

In some example embodiments, the auxiliary input/output (I/O) subsystems 250 may include an external communication link or interface; for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230 (typically including flash memory, such as a removable memory card) and a memory interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various example embodiments, the data 240 includes service data including information required by the mobile communication device 201 to establish and maintain communication with the wireless network 101. The data 240 may also include the user application data 231 such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the mobile device memory. The application data 231 may include application data 231 which is associated with a specific application. For example, an application which is a game may have associated application data 231 specifying high scores, etc.

In some example embodiments, the data 240 may include identification data such as a Personal Identification Number ("PIN") 241 identifying either the user or the mobile device. In some example embodiments, the PIN is a unique identifier assigned to the mobile communication device 201 during manufacturing of that device 201. The PIN may be saved in non-volatile memory so that the mobile device will retain the PIN even when it is powered off. In some example embodiments the identification data, such as the PIN 241 may be transmitted to the application delivery server 138 as part of the purchase, download (i.e. transmission), or re-download (i.e. re-transmission) method associated with the delivery and subsequent re-delivery of an application from the application delivery server 138 to the mobile communication device 201.

In some example embodiments, the remote storage module 228 may provide for the backup and restoration of application data 231. Application data 231 may be backed up to a remote server; such as, for example, the application delivery server 138. For example, the mobile device 201 may transfer application data 231 associated with one or more application to the application delivery server 138. Also, the application data 231 may be automatically backed up to the application delivery server 138 periodically, upon achievements or completion of various levels, or upon purchase of associated digital goods from within the application.

In one example embodiment, when a request to remove an application from the mobile device 201 is received (for example, via an input mechanism), the remote storage module 228 transfers application data 231 to a remote server, such as the application delivery server 138. The remote server stores the application data 231. Later, if a user wishes to re-install the application to the same device (or, in some example embodiments, to other devices), the application data 231 is automatically retrieved from the server and stored in memory 244 on the mobile device 201 so that it is accessible by the re-installed application.

In another scenario, a user may backup application data 231 to a server, such as the application delivery server 138, to transition to a different mobile device 201. For example, a user may purchase a new mobile device 201 (referred to as a "second device") and may wish to use the same applications, with at least some of the same application data 231, on the new device which were previously installed on the old device 201 (referred to as a "first device"). The remote storage module 228 may allow a user to initiate a transfer of the application data 231 associated with an application from the first device to the server (i.e. the application data 231 may be backed up to the server).

The second device 201, which may also include the features discussed with respect to FIG. 2, may, automatically or at the request of the user via the input mechanism, retrieve and install one or more applications which were previously installed on the first device 201. That is, the second device 201 may request such applications from the application delivery server 138. Upon receiving a request from the new device 201 for the application, the application delivery server 138 may automatically transfer the application and the associated application data 231 to the second device 201. The second device 201 may automatically save the application data 231 to its memory 244. Again, such application data 231 may include digital goods 281 acquired from within an application.

Thus, a "Digital Locker", storing applications and/or digital goods for a user, may include one or more of the following features. In at least some example embodiments, if an application is restored to a mobile device and the application uses digital goods that are stored elsewhere, a user of the application and/or the digital goods may be notified that the digital goods should be downloaded (i.e. transmitted) again. That is, a server operated or controlled by the developer may be notified that the application has been restored and the server may provide the associated digital goods to the mobile device.

In some example embodiments, if an application that uses digital goods is restored to a mobile device and that application contains digital goods which were previously purchased (for example, if the application is delivered with the digital goods but the digital goods are initially stored in a locked state), access to those digital goods may be automatically unlocked upon successful restore of the application.

In at least some example embodiments, if the user deletes an application that uses digital goods from his/her mobile device, the application and unlocked digital goods may persist in the user's Digital Locker. That is, the application and/or the unlocked digital goods may be stored elsewhere (e.g. on a server). The Digital Locker may track the applications and/or digital goods that a user, device, or account has access to (e.g. applications which were previously purchased). Applications and/or digital goods may be restored to a mobile device associated with a user, device, or account which has access to such applications and/or digital goods. As will be discussed in greater detail below, digital goods may automatically be restored when an associated application is restored.

The digital storage locker may include authentication features so that a mobile device switch (i.e. a user's switch from one mobile device to another mobile device) cannot be used to duplicate or bypass payment in a way to scam application vendors and to prevent users from being double charged for movement of items, such as applications and/or digital goods.

In at least some example embodiments, the mobile device (and/or the remote storage module 228) is configured to display details regarding digital goods which were previously purchased for an application. That is, the mobile device may present visual information which allow a user to track previously purchased digital goods.

The nature of the information that may be displayed to the user may depend on the type of digital good. In various example embodiments, the mobile device may be configured to display any of the following information regarding digital goods. In at least some example embodiments, the mobile device may be configured to display a name associated with the digital good. In some example embodiments, the mobile device may display an unlock code or a license key associated with the digital good. In some example embodiments, the mobile device may display an indication showing that the digital good is available (e.g. that the user has already purchased it). If a digital good has not been purchased, but all the digital goods associated with an application are displayed in a description for that application, the remote storage module 228 may display an indicator that the non-purchased digital goods are "locked"/"unavailable unless purchased" (or a similar indictor). If a digital good is free (i.e. available at no cost), the mobile device may display an indicator which marks it as free. If the digital good involves downloading (i.e. transmitting)/installing extra application files, such install status may be displayed by the mobile device. In at least some example embodiments, the mobile device may display version information associated with a digital good (e.g. if there can be different versions for the same digital goods for the same application version). Other information may also be displayed.

The serial data port 252 may be used for synchronization with a user's host computer system (not shown). The serial data port 252 enables a user to set preferences through an external device or software application and extends the capabilities of the mobile communication device 201 by providing for information or software downloads (i.e. transmissions) to the mobile communication device 201 other than through the wireless network 101. The alternate download path may, for example, be used to load an encryption key onto the mobile communication device 201 through a direct, reliable and trusted connection to thereby provide secure device communication.

In some example embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 222 or software applications 224 may also be loaded onto the mobile communication device 201 through the wireless network 101, the auxiliary I/O subsystem 250, the data port 252, the short-range communication subsystem 272, or other suitable subsystem 274 other wireless communication interfaces. The downloaded (i.e. transmitted) programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Example Server

Referring now to FIG. 3, an application delivery server 138 for use in accordance with one example embodiment of the present disclosure will now be described in greater detail. The application delivery server 138 may, for example, be implemented using any known general purpose computer technology, and may, for example, be realized as one or more microprocessor based server computers implementing one or more server applications configured for performing the processes and functions described herein.

The application delivery server 138 may include one or more controllers, such as a processor 340 for controlling the overall operation of the server 138. The application delivery server 138 may communicate with other devices connected to the network 124 through a communication subsystem and network interface 320. For example, the application delivery server 138 may communicate with the mobile devices 201 (FIG. 1) via the wireless connector system 120 (FIG. 1). The application delivery server 138 has access to a data store 332 which may be local to the server 138 or remote from the server

138. The data store 332 contains applications 334 which are available for download (i.e. transmission), application data 231, and application information 336 describing the applications available for download, and application history information 338 identifying the applications 334 that a user or mobile device 201 has access to. That is, the application history information 338 identifies the applications 334 each user, account, or mobile device 201 is permitted to re-download (i.e. re-transmit). The application data 231 may include the digital goods 281 purchased from within the application, such as additional levels or features for a game application.

The processor 340 of the application delivery server 138 operates under stored program control and executes software modules 322 stored in memory 344 such as persistent memory; for example, on a hard disk drive. As illustrated in FIG. 3, the software modules 322 include an application store module 326 for interfacing with the application store client 226 (FIG. 2) and remote storage module 228 on the mobile communication devices 201 and providing for the download, backup, re-download, and/or purchase of software applications 334.

In some example embodiments, the application store module 323 permits users of mobile devices 201 to purchase and download (i.e. transmission) applications for use on the mobile devices 201. The application store module 323 of the application delivery server 138 includes an application delivery module 326 for receiving a request from a mobile device 201 for delivering an application to the mobile device 201, retrieving the application 334 from a data store 332, and transmitting the application 334 to the mobile communication device 201. In some example embodiments, the application delivery module 326 may process a payment for an application 334. For example, the application delivery module 326 may post a charge to an account associated with the mobile communication device 201 or its user or process a credit card transaction. The application store module may act as a remote storage module, allowing users or mobile devices 201 to retrieve and download previously purchased applications 334 and/or associated digital goods 281.

To provide such remote storage capabilities, after transmitting the application 334 to the mobile device and/or processing a payment associated with the application transfer, the application store module 323 creates a record of the purchase or download by updating the application history information 338 associated with the user. The application history information 338 specifies the applications 334 that are available for a user or mobile device 201 to re-download at a later time. Each user or mobile device 201 which has purchased an application 334 through the application store 323 has application history information 338 associated with that user. The application history information 338 may be, for example, stored in one or more databases which may be indexed by an identifier associated with the user or the mobile device 201. For example, the database may be indexed by the PIN 241 associated with the mobile device 201. The application history information 338 includes data relating to previously purchased applications. For example, the application history information 338 may include an identifier associated with and identifying applications which were previously purchased, a version number associated with the application, a record of the total number of downloads of an application 334 since it was purchased or over a predetermined period of time. For example, the application history information 338 may track the number of times a user has downloaded an application 334 in the past year. In some example embodiments, if the total number of downloads reaches or exceeds a predetermined threshold which specifies the amount of downloads available to a user or device 201, the application store module 323 may prevent the re-downloading of the application 334. Accordingly, each user or mobile device 201 may have an application history information 338 record specifying an application purchase or download history for that user.

The application delivery module 326 transmits, to the mobile device 201 information specifying the applications 334 which are available for re-download (i.e. re-transmission). For example, the application delivery module 326 may determine, from the application history information 338, the applications that are available for download (i.e. transmission) to the mobile device 201 and notify the mobile device 201 of details of the applications 334 that are available for re-download. By way of non-limiting example, these details may include: the name of the application, a version number associated with the application, a date of purchase of the application, and other application information 336 regarding the application such as a description of the application and/or available application data 231 including digital goods 281.

Later, the application delivery module 326 may receive a request from the mobile device 201 to re-download an application. The application delivery module 326 retrieves the requested application 334 and transmits it to the mobile device 201. In some example embodiments, the application delivery module 326 may be configured to record details of the re-download to the application history information 338 record associated with the mobile device 201 or user making the download request.

In some example embodiments, the application delivery server 138 includes a backup module 353 which is configured to facilitate the backup of application data 231. In the example embodiment of FIG. 3, the backup module 353 is illustrated as being included within the application store module 323. However, it will be appreciated that the backup module 353 could be located in other modules and may, in at least some example embodiments, be located in a server that is physically separate from the application delivery server 138.

In some example embodiments, the backup module 353 may provide for the backup and restoration of application data 231 received from one or more mobile device 201. The mobile device 201 may transfer application data 231 associated with one or more application to the application delivery server 138.

The mobile device 201 may transfer application data 231 to the server 138 in response to the occurrence of one or more predetermined trigger events. The trigger event may be, for example, one or more of the following: the receipt of a request to delete the application associated with the application data 231, the deletion of the application associated with the application data 231 from the memory 244, a request received via an input mechanism to backup the application data 231, or the receipt of a request to switch to a different device, such as a new device. Other trigger events are also possible. The backup module 353 may be configured to store the application data 231 and associated digital goods 281 in memory 344.

Later, the application data 231 and associated digital goods 281 may be transferred to a mobile device 201. In some example embodiments, the application data 231 may be transmitted to a mobile device 201 if a request to reinstall the application associated with the application data 231 is received from the same device 201 or user or a user or device associated with the same account. When such a request is received the application delivery module 326 may transfer the application to the requesting device 201 and the backup module 353 may retrieve the associated application data 231 and transmit it to the requesting device 201.

Similarly, in at least some example embodiments, digital goods which were acquired through an application may be restored to a mobile device 201 when such that application is restored.

Example Method of Managing the Use of Applications and Digital Goods

Figure 4:
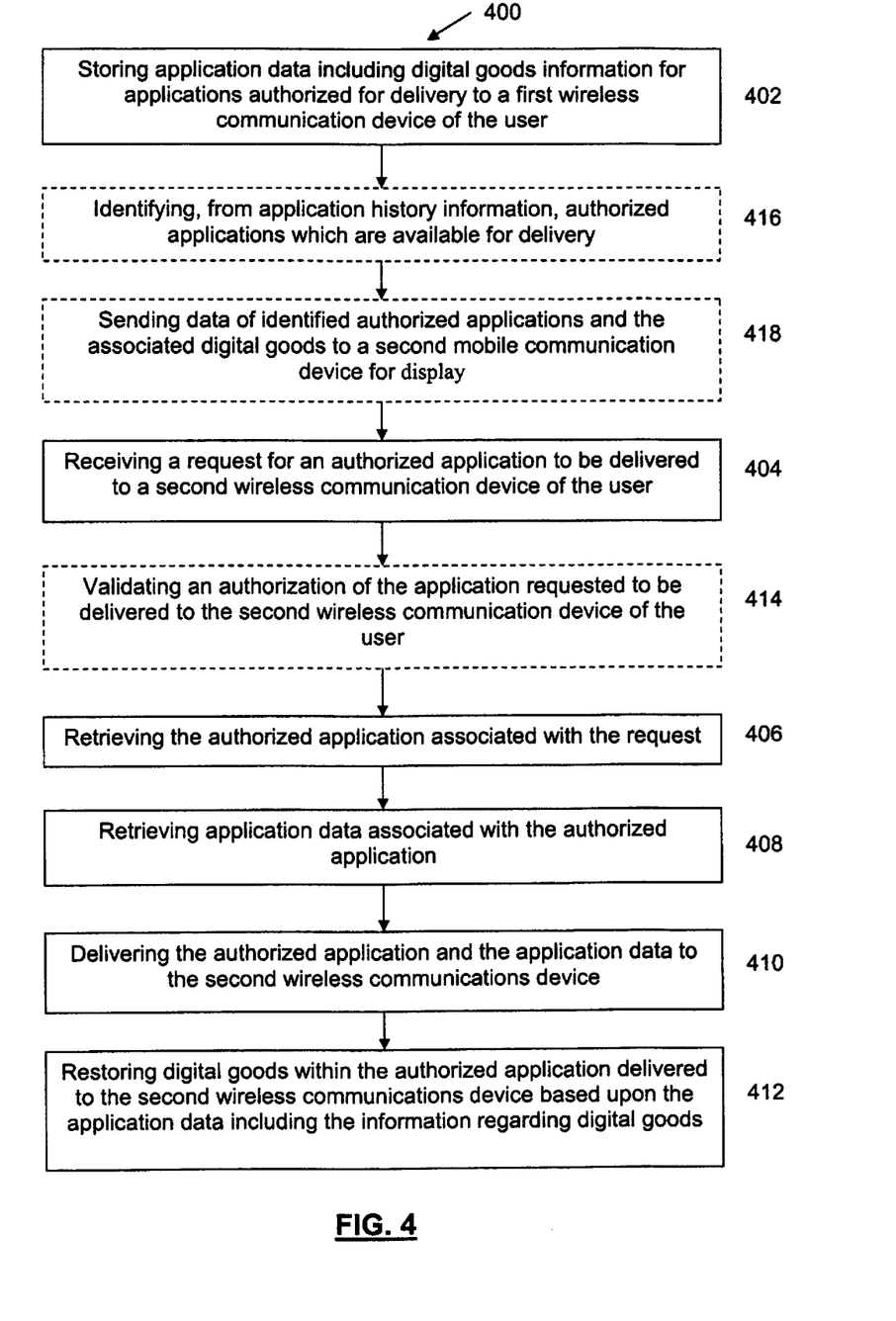
FIG. 4 is a flowchart illustrating a method for restoring a software application including associated digital goods in accordance with example embodiments of the present disclosure.

Reference is now made to FIG. 4 which illustrates an example embodiment of a method 400 of managing the use of applications 334 from the application delivery server 138 to a user of a wireless communications network. The application store module 323 (FIG. 3), for example, may be configured to perform various steps or operations of such method 400. More particularly, the application store module 323 may include computer readable instructions which may be executable by the processor 340 (FIG. 3) to perform the method 400.

The method 400 includes storing 402, in a memory 344, application data 231 for applications 334 authorized for delivery to a first wireless communication device 201 of the user. The application data 231 is data which is used by an associated application. The application data 231 may be user or device specific data, such as user settings or preferences associated with an application, user achievements (e.g. high scores associated with a game, etc.) The application data is, in at least some example embodiments, configured or created by a user of the mobile device 201.

In at least some example embodiments, the application data 231 may include digital goods 280 acquired by a user from within an authorized application (i.e. within an application authorized for delivery to the mobile device). In other example embodiments, the application data 231 may include information regarding digital goods 281 acquired by the user from within authorized applications 334. An authorized application is an application which is authorized for delivery to the mobile device, such as, for example, an application that the mobile device has rights to. Such rights may exist, for example, as a result of a prior download (i.e. transmission) by the same device or user of the authorized application.

At 404, the method includes receiving, at the application delivery server 138, a request for an authorized application 334. The request may be a request for the authorized application 334 to be delivered to a second wireless communication device 201 of the user. For example, the user may have multiple authorized devices 201 associated with an account, the user may have deleted the previously purchased application, and/or the user may be switching/upgrading to a new device 201.

The method 400 includes, in response to receiving the request, retrieving 406 the authorized application 334 associated with the request, retrieving 408 application data 231 associated with the authorized application 334, and delivering 410 the authorized application 334 and the application data 231 to the mobile device from which the request was received (e.g. the second wireless communications device 201).

At 412, the method includes restoring digital goods 281 within the authorized application 334 delivered to the wireless communications device 201 (e.g. the second wireless communications device 201).

In at least some example embodiments, the application data 231 delivered at 410 may include the digital goods which were acquired by the user from within the authorized application. In other example embodiments, the application data 231 may include information regarding the digital goods which were acquired by the user from within the authorized application. In such example embodiments, the digital goods 281 may be restored based upon the application data, such as the information regarding the digital goods.

The information regarding digital goods 281 acquired by the user from within authorized applications may include links to content stored by an application developer. The information regarding digital goods 281 acquired by the user from within authorized applications 334 may include information regarding digital goods 281 purchased through an application store 323 on the application delivery server 138. The information regarding digital goods 281 acquired by the user from within authorized applications 334 may include unlockable content within the authorized application 334, and restoring 412 the digital goods 281 may then include unlocking the unlockable content.

In at least some example embodiments, the method 400 may also include identifying 416, from application history information 338, authorized applications 334 which are available for delivery to the second mobile communication device 201. The application history information 338 identifies the applications 334 each user, account, or mobile device 201 is permitted to re-download (i.e. re-transmit).

Then, at 418, the method 400 includes sending data of identified authorized applications 334 and the associated digital goods 281 to the mobile device from which the request was received at 404 (e.g. the second mobile communication device 201) for display thereon. As discussed above, the memory 344 may define a "digital locker" to store the application data 231 associated with the user. That is, a user may be able to view authorized applications (i.e. applications which are authorized for delivery to the mobile device) and any digital goods which are associated with such applications which are also authorized for delivery to the mobile device.

In at least some example embodiments, the method 400 may also include validating 414, at the application delivery server 138, an authorization of the application 334 requested to be delivered to the wireless communication device 201 (e.g. the second wireless communication device of the user). That is, the application delivery server 138 may ensure that the wireless communication device which is requesting the application at 404 is received the application. Such a validation may include, for example, confirming that the request at 404 is received from a wireless communication device 201 which is associated with a user who previously purchased and/or downloaded (i.e. transmitted) the application (for example, on another wireless communication device 201, such as the first wireless communication device 201). Validating 414 may include consulting application history data 338 to confirm that a user, account, or device is permitted to download the application.

FIG. 4 is a flowchart illustrating a method for restoring a software application including associated digital goods in accordance with example embodiments of the present disclosure. Some of the steps illustrated in the flowchart may be performed in an order other than that which is described. Also, it should be appreciated that not all of the steps described in the flow charts are required to be performed, that additional steps may be added, and that some of the illustrated steps may be substituted with other steps.

Many modifications and other example embodiments of the invention will come to the mind of one skilled in the art having the benefit of the teachings presented in the foregoing descriptions and the associated drawings. Therefore, it is understood that the invention is not to be limited to the specific example embodiments disclosed, and that modifications and other example embodiments are intended to be included within the scope of the appended claims.

That which is claimed is:

1. A method of restoring digital goods previously acquired and associated with an application, comprising:
receiving, at an application delivery server, a request for the application to be delivered to a communication device, the request identifying the application to be delivered; and
in response to receiving the request:
retrieving the application associated with the request;
sending the application associated with the request to the communication device; and
automatically restoring the digital goods previously acquired and associated with the application to the communication device, wherein the digital goods are goods purchased within the application for use within the application, wherein the digital goods include additional features in a game application.

2. The method of claim 1, further comprising:
storing, in a memory, application data for applications authorized for delivery to the communication device, the application data including information regarding digital goods acquired from within the application; and
in response to receiving the request, retrieving application data associated with the application and delivering the application data to the communications device,
and wherein automatically restoring digital goods previously acquired comprises restoring the digital goods based upon the application data including the information regarding digital goods.

3. The method of claim 2, wherein the memory comprises a database associated with the application delivery server.

4. The method of claim 2, wherein the memory defines a digital locker to store at least the application data.

5. The method of claim 2, wherein the information regarding digital goods acquired from within the application comprises links to content stored by an application developer.

6. The method of claim 2, wherein the information regarding digital goods acquired from within the application comprises information regarding digital goods purchased through an application store on the application delivery server.

7. The method of claim 2, wherein the information regarding digital goods acquired from within the application comprises unlockable content within the application and wherein automatically restoring digital goods comprises unlocking the unlockable content.

8. The method of claim 1, further comprising validating, at the application delivery server, an authorization of the application requested to be delivered to the communication device.

9. The method of claim 1, wherein the digital goods are digital goods previously acquired through the application on a first communication device and wherein the request for the application to be delivered is a request for the application to be delivered to a second communication device which is associated with a common account as the first communication device.

10. The method of claim 1, further comprising:
identifying, from application history information, applications which are available for delivery to the communication device; and
sending data of identified applications and associated digital goods to the communication device for display thereon.

11. The method of claim 1 wherein automatically restoring the digital goods comprises restoring the digital goods previously acquired and associated with the application to the communication device without specific input to restore such digital goods.

12. The method of claim 1 wherein automatically restoring the digital goods previously acquired from within the application and associated with the application to the communication device comprises: identifying the digital goods previously acquired and associated with the application.

13. An application delivery system comprising:
an application delivery server including a communication subsystem to communicate over a wireless communications network,
the application delivery server comprising a controller configured to:
receive, at the application delivery server, a request for the application to be delivered to a communication device, the request identifying the application to be delivered; and
in response to receiving the request:
retrieve the application associated with the request;
send the application associated with the request to the communication device; and
automatically restore digital goods previously acquired and associated with the application to the communication device, wherein the digital goods are goods purchased within the application for use within the application,
wherein the digital goods include additional features in a game application.

14. A method of managing the use of applications from an application delivery server to wireless communication devices, comprising:
storing, in a memory, application data for applications authorized for delivery to a first wireless communication device, the application data including information regarding digital goods acquired at the first wireless communication device from within authorized applications;
receiving, at the application delivery server, a request for an authorized application to be delivered to a second wireless communication device, the request identifying the application to be delivered;
in response to receiving the request, retrieving the authorized application associated with the request, retrieving application data associated with the authorized application, delivering the authorized application and the application data to the second wireless communication device; and
automatically restoring digital goods within the authorized application delivered to the second wireless communication device based upon the application data including the information regarding digital goods, wherein the digital goods are goods purchased within the application for use within the application,
wherein the digital goods include additional features in a game application.

15. The application delivery system of claim 13, wherein the controller is further configured to:
store, in a memory, application data for applications authorized for delivery to the communication device, the application data including information regarding digital goods acquired from within the application; and
in response to receiving the request, retrieve application data associated with the application and deliver the application data to the communications device,
and wherein automatically restoring digital goods previously acquired comprises restoring the digital goods based upon the application data including the information regarding digital goods.

16. The application delivery system of claim 15, wherein the memory comprises a database associated with the application delivery server.

17. The application delivery system of claim 15, wherein the memory defines a digital locker to store at least the application data.

18. The application delivery system of claim 15, wherein the information regarding digital goods acquired from within the application comprises links to content stored by an application developer.

19. The method of claim 1, wherein the digital goods include upgraded feeds or subscriptions to a media application.

\* \* \* \* \*